(12) United States Patent
Yang et al.

(10) Patent No.: US 10,282,140 B2
(45) Date of Patent: May 7, 2019

(54) I/O WORKLOAD SCHEDULING MANAGER FOR RAID/NON-RAID FLASH BASED STORAGE SYSTEMS FOR TCO AND WAF OPTIMIZATIONS

(71) Applicant: Samsung Electronics Co., Ltd., Suwon-si, Gyeonggi-do (KR)

(72) Inventors: Zhengyu Yang, Boston, MA (US); Manu Awasthi, San Jose, CA (US)

(73) Assignee: Samsung Electronics Co., Ltd. (KR)

( * ) Notice: Subject to any disclaimer, the term of this patent is extended or adjusted under 35 U.S.C. 154(b) by 129 days.

(21) Appl. No.: 15/396,186

(22) Filed: Dec. 30, 2016

(65) Prior Publication Data

US 2018/0107426 A1    Apr. 19, 2018

Related U.S. Application Data

(60) Provisional application No. 62/409,685, filed on Oct. 18, 2016.

(51) Int. Cl.
*G06F 3/06*     (2006.01)

(52) U.S. Cl.
CPC ............ *G06F 3/0688* (2013.01); *G06F 3/064* (2013.01); *G06F 3/0605* (2013.01)

(58) Field of Classification Search
None
See application file for complete search history.

(56) References Cited

U.S. PATENT DOCUMENTS

| | | | |
|---|---|---|---|
| 6,269,453 B1 | 7/2001 | Krantz et al. | |
| 8,615,640 B2 | 12/2013 | Jibbe et al. | |
| 8,700,842 B2 | 4/2014 | Dinker | |
| 8,996,957 B1 | 3/2015 | Northcott | |
| 9,021,231 B2 | 4/2015 | Fitzpatrick et al. | |
| 9,170,746 B2 | 10/2015 | Sundaram et al. | |
| 9,176,812 B1 | 11/2015 | Northcott et al. | |
| 9,450,876 B1 * | 9/2016 | Marr | H04L 47/125 |
| 9,626,116 B1 * | 4/2017 | Martin | G06F 3/0689 |
| 9,811,288 B1 * | 11/2017 | Chen | G06F 3/0679 |
| 2012/0109936 A1 | 5/2012 | Zhang et al. | |
| 2014/0149663 A1 * | 5/2014 | Golander | G06F 3/0605 |
| | | | 711/114 |
| 2015/0019918 A1 | 1/2015 | Li et al. | |

(Continued)

OTHER PUBLICATIONS

STEC, "Engineering MLC Flash-based SSDs to reduce total cost of ownership in enterprise ssd deployments," http://www.storagesearch.com/stec-cellcare-paper.pdf, Sep. 4, 1997.

(Continued)

*Primary Examiner* — Edward J Dudek, Jr.
*Assistant Examiner* — Ralph A Verderamo, III
(74) *Attorney, Agent, or Firm* — Innovation Counsel LLP

(57) ABSTRACT

A method for allocating workloads to RAID and non-RAID mode disk pools includes: receiving a workload; estimating a cost for allocating the workload to each disk of disks in a disk pool based on a total amount of logical data written to the each disk using a data-average TCO rate model; determining a disk among the disks in the disk pool that minimizes a total cost of ownership (TCO) by comparing costs estimated for the disks; and allocating the workload to the disk.

21 Claims, 7 Drawing Sheets

(56) References Cited

U.S. PATENT DOCUMENTS

| | | | |
|---|---|---|---|
| 2015/0237140 A1* | 8/2015 | Murphy | H04L 67/1097 |
| | | | 709/216 |
| 2015/0277768 A1* | 10/2015 | Zhou | G06F 3/061 |
| | | | 711/114 |
| 2016/0179410 A1 | 6/2016 | Haas et al. | |
| 2017/0131948 A1* | 5/2017 | Hoang | G06F 3/0653 |

OTHER PUBLICATIONS

Non-published U.S. Appl. No. 15/092,156, Zhengyu Yang et al., "Online Flash Resource Allocation Manager Based on TCO Model Profiling WAF of NVMe under different Workloads.", filed Apr. 6, 2016.

Non-published U.S. Appl. No. 15/094,971, Zhengyu Yang et. al, "Online Flash Resource Migration, Allocation, Retire and Replacement Manager Based on Multiple Workloads WAF TCO Model.", filed Apr. 8, 2016.

P. Desnoyers, "Analytic modeling of SSD write performance," Proceedings of the 5th Annual International Systems and Storage Conference. ACM, 2012, p. 12.

W. Bux and L Iliadis, "Performance of greedy garbage collection in flash-based solid-state drives," Performance Evaluation, vol. 67, No. 11, pp. 1172-1186, 2010.

M. Balakrishnan et. al, "Differential RAID: rethinking RAID for SSD reliability," ACM Transactions on Storage (TOS), vol. 6, No. 2, p. 4, 2010.

D. Narayanan et al., "Migrating server storage to SSDs: analysis of tradeoffs," Proceedings of the 4th ACM European conference on Computer systems. ACM, 2009, pp. 145-158.

* cited by examiner

I/O WORKLOAD SCHEDULING MANAGER FOR RAID/NON-RAID FLASH BASED STORAGE SYSTEMS FOR TCO AND WAF OPTIMIZATIONS

CROSS-REFERENCE TO RELATED APPLICATION(S)

This application claims the benefits of and priority to U.S. Provisional Patent Application Ser. No. 62/409,685 filed Oct. 18, 2016, the disclosure of which is incorporated herein by reference in its entirety. This application also relates to co-pending U.S. patent application Ser. No. 15/094,971 entitled "ONLINE FLASH RESOURCE MIGRATION, ALLOCATION, RETIRE AND REPLACEMENT MANAGER BASED ON A COST OF OWNERSHIP MODEL" and filed Apr. 8, 2016 and Ser. No. 15/092,156 entitled "ONLINE FLASH RESOURCE ALLOCATION MANAGER BASED ON A TCO MODE" and filed Apr. 6, 2016, the disclosures of which are incorporated herein by reference in its entirety.

TECHNICAL FIELD

The present disclosure relates generally to data storage systems and methods, more particularly, to a system and method for allocating workloads to storage devices in a disk pool based on a total cost of ownership (TCO) model.

BACKGROUND

The maintenance of an SSD-intensive datacenter can be costly. Various total cost of ownership (TCO) models have been proposed to evaluate and assess storage subsystem solutions. However, there is no standard formula for calculating the TCO of the SSD-intensive storage subsystem. In order to comprehensively access the expenditure of a datacenter, a TCO model should account for purchasing and maintenance costs, service times, served I/O amount and device wearout.

Sequentiality of writes in input/output (I/O) operations has a big impact on write amplification of solid-state drives (SSDs). Increased randomness in a write stream increases the write amplification of the SSDs. Since SSDs have limited write (erase) cycles, a higher WAF caused by randomness in a write stream can shorten the lifetime of the SSDs and thus increase the TCO of a datacenter.

Write amplification affects the limited lifecycle of SSDs. For example, workload patterns with different sequential ratios can vary write amplification even on the same SSD. The varying write amplification caused by different sequential ratios can change the lifetime of the device eventually affecting the TCO. Therefore, there is a need to evaluate storage systems from a cost perspective including diverse dimensions such as maintenance and purchase cost, device wearout, workload characteristics, and total data amount that can be written to the disk.

SUMMARY

According to one embodiment, a method includes: receiving a workload; estimating a cost for allocating the workload to each disk of disks in a disk pool based on a total amount of logical data written to the each disk using a data-average TCO rate model; determining a disk among the disks in the disk pool that minimizes a total cost of ownership (TCO) by comparing costs estimated for the disks; and allocating the workload to the disk.

According to another embodiment, a method includes: receiving a workload; estimating a cost for allocating the workload to each disk set of disk sets in a disk pool of a RAID storage system based on a data-average TCO rate model based on a total amount of logical data written to the each disk set; determining a disk set among the disk sets in the disk pool that minimizes a total cost of ownership (TCO) by comparing costs estimated for the disk sets; and allocating the workload to the disk set.

According to another embodiment, a system includes: a workload generator configured to generate workloads; a plurality of disks stored in a disk pool; and a dispatcher comprising a storage storing a data-average TCO rate model and cost factors for each disk of the plurality of disks in the disk pool and a workload queue for storing the workloads received from a host computer via a host interface. The dispatcher is configured to generate an estimated cost for allocating a workload stored in the workload queue to each disk of the plurality of disks based on a total amount of logical data written to the each disk using a data-average TCO rate model, determine a disk among the plurality of disks in the disk pool that minimizes a TCO by comparing costs estimated for the plurality of disks, and dispatch the workload to the disk.

The above and other preferred features, including various novel details of implementation and combination of events, will now be more particularly described with reference to the accompanying figures and pointed out in the claims. It will be understood that the particular systems and methods described herein are shown by way of illustration only and not as limitations. As will be understood by those skilled in the art, the principles and features described herein may be employed in various and numerous embodiments without departing from the scope of the present disclosure.

BRIEF DESCRIPTION OF THE DRAWINGS

The accompanying drawings, which are included as part of the present specification, illustrate the presently preferred embodiment and together with the general description given above and the detailed description of the preferred embodiment given below serve to explain and teach the principles described herein.

Figure 1:
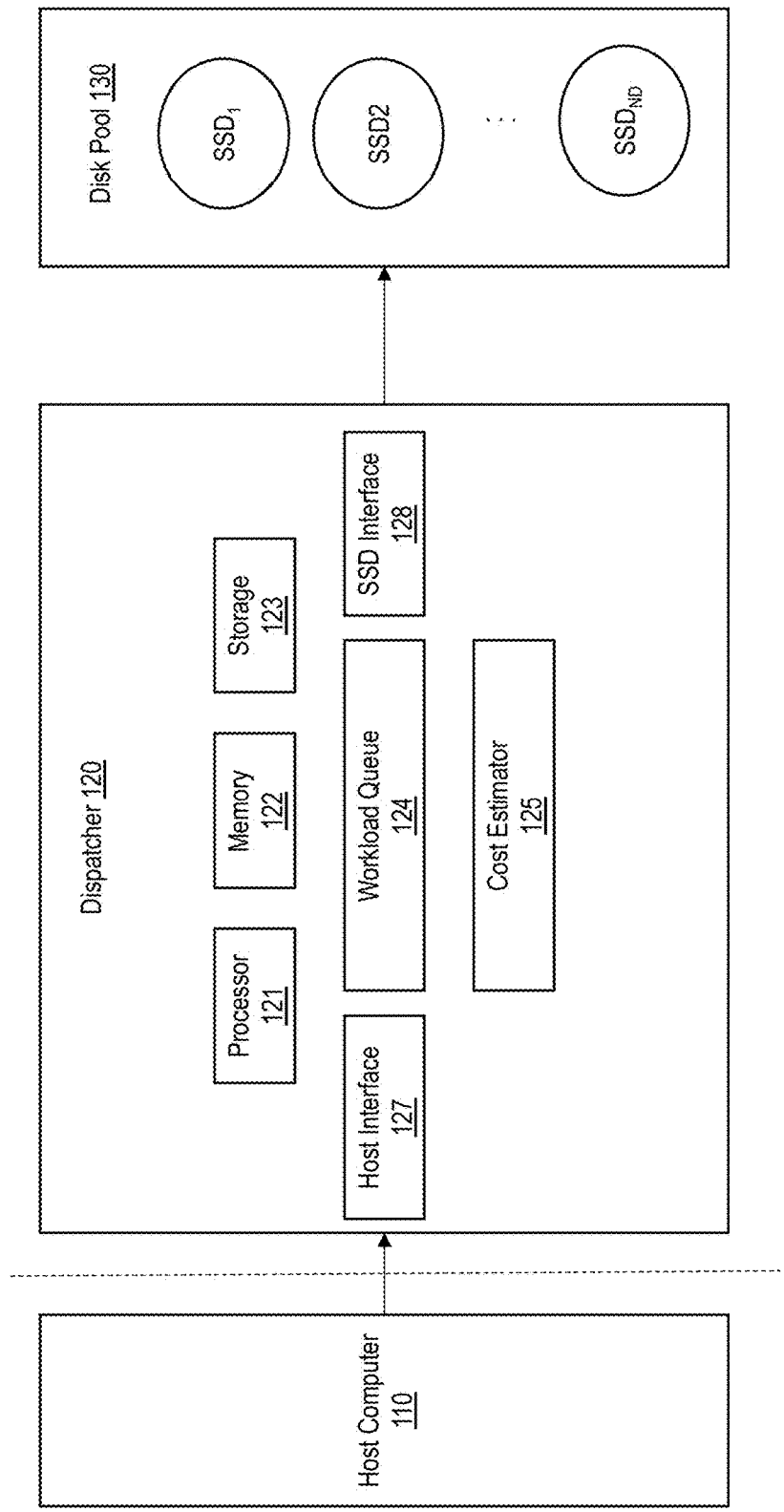
FIG. 1 shows a block diagram of an example flash-based storage system, according to one embodiment.

The figures are not necessarily drawn to scale and elements of similar structures or functions are generally represented by like reference numerals for illustrative purposes throughout the figures. The figures are only intended to facilitate the description of the various embodiments described herein. The figures do not describe every aspect of the teachings disclosed herein and do not limit the scope of the claims.

DETAILED DESCRIPTION

Each of the features and teachings disclosed herein can be utilized separately or in conjunction with other features and teachings to provide a system and method for allocating workloads to a disk in a disk pool based on a data-average TCO rate model. Representative examples utilizing many of these additional features and teachings, both separately and in combination, are described in further detail with reference to the attached figures. This detailed description is merely intended to teach a person of skill in the art further details for practicing aspects of the present teachings and is not intended to limit the scope of the claims. Therefore, combinations of features disclosed above in the detailed description may not be necessary to practice the teachings in the broadest sense, and are instead taught merely to describe particularly representative examples of the present teachings.

In the description below, for purposes of explanation only, specific nomenclature is set forth to provide a thorough understanding of the present disclosure. However, it will be apparent to one skilled in the art that these specific details are not required to practice the teachings of the present disclosure.

Some portions of the detailed descriptions herein are presented in terms of algorithms and symbolic representations of operations on data bits within a computer memory. These algorithmic descriptions and representations are used by those skilled in the data processing arts to effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the below discussion, it is appreciated that throughout the description, discussions utilizing terms such as "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms presented herein are not inherently related to any particular computer or other apparatus. Various general-purpose systems, computer servers, or personal computers may be used with programs in accordance with the teachings herein, or it may prove convenient to construct a more specialized apparatus to perform the required method steps. The required structure for a variety of these systems will appear from the description below. It will be appreciated that a variety of programming languages may be used to implement the teachings of the disclosure as described herein.

Moreover, the various features of the representative examples and the dependent claims may be combined in ways that are not specifically and explicitly enumerated in order to provide additional useful embodiments of the present teachings. It is also expressly noted that all value ranges or indications of groups of entities disclose every possible intermediate value or intermediate entity for the purpose of an original disclosure, as well as for the purpose of restricting the claimed subject matter. It is also expressly noted that the dimensions and the shapes of the components shown in the figures are designed to help to understand how the present teachings are practiced, but not intended to limit the dimensions and the shapes shown in the examples.

The present disclosure describes a data-average total cost of ownership (TCO) rate model. The present data-average TCO rate model is differentiated from a time-average TCO rate model in that it accounts for the total amount of logical data written to an SSD. The present data-average TCO rate model is built based on a WAF model that is regressed into a piecewise function including a linear part and a polynomial part. An online workload allocation algorithm, herein referred to as minTCO-Perf, considers statistical metrics (e.g., load balancing and resource utilization) as performance factors in allocating workloads. The present data-average TCO rate model reduces the TCO, maximizes the workload throughput, and further balances the workloads among disks to increase the overall resource utilization.

The present system and method takes an approximation approach to extend the minTCO-Perf algorithm to array of independent disks (RAID) SSD-intensive datacenter use cases. The approximation approach for RAID can guide a datacenter manager to make workload dispatch decisions in a RAID SSD-intensive environment.

Using the present data-average TCO rate model, a dispatcher can run an algorithm (herein also referred to as minTCO-Perf) for minimizing the TCO for allocating workloads. The dispatcher can allocate the workloads to a particular disk among the disks in a disk pool.

It is noted that the present data-average TCO rate model can be independent of a write amplification factor (WAF) of the disks, and any WAF model can be employed in the present data-average TCO rate model to calculate the TCO. Due to the independence of the TCO model from the WAF model, the dispatcher is applicable to any SSD storage system that includes different types or combinations of SSDs having different WAF characteristics.

Examples of the SSD storage systems that the present data-average TCO rate model is applicable to can include various types and combinations of non-volatile memories including, but not limited to, a flash memory, a phase-change RAM (PRAM), a spin-transfer torque magnetic random access memory (STT-MRAM), and a resistive RAM (ReRAM).

FIG. 1 shows a block diagram of an example flash-based storage system, according to one embodiment. The flash-based storage system includes a host computer 110, a dispatcher 120, and a disk pool 130 including a plurality of SSDs. The dispatcher 120 includes at least one processor 121, a memory 122, and a storage 123 for storing various programs and the associated data, and cost factors for each of the SSDs in the disk pool 130. Via a host interface 127, the dispatcher 120 receives a workload from the host computer 110 or a workload generator 510 shown in FIG. 5. The workload can include a write request to write data to one of the SSDs in the disk pool 130. The workload is stored in a workload queue 124 for further processing. First, the cost estimator 125 estimates a cost for allocating the workload to one of the SSDs in the disk pool 130 based on a cost model (e.g., a total cost of ownership (TCO) model). Based on the estimated costs to allocate the workload to each one of the SSDs in the disk pool 130, the cost estimator 125 determines which SSD in the disk pool 130 can minimize a TCO for allocating the workload. Via a SSD interface 128, the dispatcher 120 dispatches the workload to the SSD that was identified by the cost estimator 125 to minimize the TCO.

Although the dispatcher 120 is shown to be separate from the host computer 110 in FIG. 1, it is understood that the dispatcher 120 can run on the host computer as an application. A group of host computers may be present in a data center, and those host computers may communicate over a network to orchestrate the operation of the dispatcher 120 among the SSDs that may be distributed over the network.

The present system and method provides a data-average TCO rate model. The data-average TCO rate model is constructed based on the following two types of costs, namely, a capital expense CapEx ($C_{I_i}$) and an operational expense OpEx ($C'_{M_i}$):

$$\begin{cases} C_{I_i} = C_{Purchase_i} + C_{Setup_i} \\ C'_{M_i} = C'_{Power_i} + C'_{Labor_i} \end{cases} \quad (1)$$

where $C_{Purchase_i}$ and $C_{Setup_i}$ are one-time costs of device purchase and device setup for an i-th disk (e.g., SSD), and $C_{Setup_i}$ and $C'_{Labor_i}$ are the power and maintenance labor cost rate per a given time period (e.g., day). Therefore, CapEx ($C_{I_i}$) is a one-time cost, and OpEx ($C'_{M_i}$) is a time-rate cost, and the TCO should be account for the capital cost and the amount of time that an SSD has been used.

The present TCO model attaches a time-rate cost to the TCO. The expected life time ($T_{Lf_i}$) of each disk (i.e., $T_{Lf_i}=T_{D_i}-T_{I_i}$, where $T_{D_i}$ and $T_{I_i}$ are the time when the disk i is completely worn out and the time when it was started accepting its first request), the total cost for purchasing and maintaining a pool of SSDs can be calculated as:

$$TCO = \Sigma_{i=1}^{N_D}(C_{I_i} + C'_{M_i} \cdot T_{Lf_i}) \quad (2),$$

where $N_D$ is the number of disks in the pool.

Figure 2:
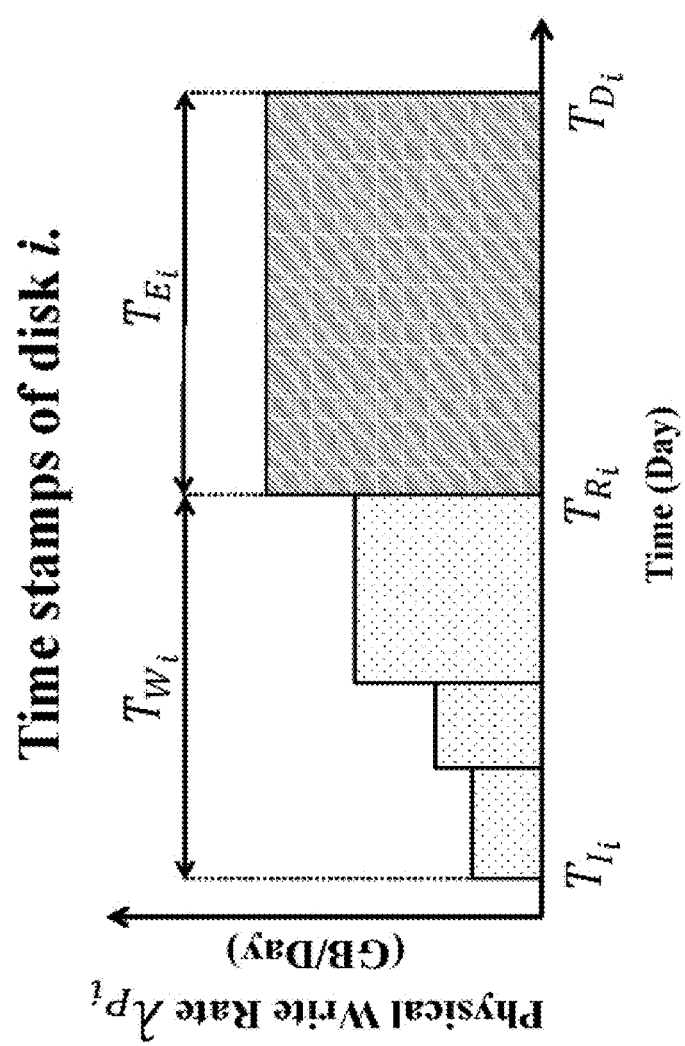
FIG. 2 illustrates an example time stamp view showing the relationship between physical write rates and workloads.

FIG. 2 illustrates an example time stamp view showing the relationship between physical write rates and workloads. As more I/O workloads arrive, the physical write rate of disk i increases accordingly. The lifetime of disk i is the period from $T_{I_i}$ to $T_{D_i}$ having two phases: (1) accumulated work epoch ($T_{W_i}$) until the last workload arrives, i.e., $T_{W_i}=T_{R_i}-T_{I_i}$, where $T_{R_i}$ is the assigned time of the most recent workload; and (2) expected work lifetime ($T_{E_i}$): from $T_{R_i}$ to the expected death time, i.e., $T_{E_i}=T_{D_i}-T_{R_i}$.

Eq. (2) does not reflect the SSD wearout that can be highly coupled with the workload arrival distribution. For instance, in a datacenter with all same model of SSDs, i.e., all disks have the same CapEx ($C_{I_i}$) and OpEx rate ($C'_{M_i}$), the SSD that is running workloads with the lowest physical write rate will have the highest TCO value according to Eq. (2). The reason is that the "endless" I/O stream running on this disk will take the longest time to consume the SSD write cycle life compared to other disks (i.e., this SSD will be the last one to be worn out), thus its expected work lifetime ($T_{Lf_i}$) and OpEx ($C'_{M_i} \cdot T_{Lf_i}$) will be the highest among the SSDs. However, this SSD may have a larger WAF due to the workload pattern, while others that died earlier may have smaller WAFs and can serve more logical write I/O amounts under the same cost.

The present data-average TCO rate model accounts for the TCO rate from the perspective of the total amount of (logical) data served (written) to an SSD. This aims to solve the limitations of a time-average TCO rate model that only reflects the wearout by estimating a lifetime without taking into consideration sequentiality of data written to the SSD. The time-average TCO rate model can be easily influenced by an interval of the arrived workloads. For example, if a dispatcher allocates workloads purely based on the time-average TCO rate, the dispatcher may allocate a majority of workloads to one single disk while leaving all other disks with light workloads or even unallocated to those other disks if the single disk can satisfy the criterion for workload assignment. This workload allocation scheme can still lead to a minimum TCO on a daily basis. However, this workload allocation scheme based on the time-average TCO rate can decrease the total logical data write amount (herein also referred to as "service amount" or "work amount") of the disk, since the disk allocated with the majority of workloads would wear out soon if an attempt for across-disk migration is not made while leaving other disks underutilized. In particular, when the workload arrival intervals are sparse, the time-average TCO rate model would only attempt to keep the disks from completely wearing out as long as possible.

According to one embodiment, the present data-averaged TCO rate (TCO') represents the total cost of ownership with respect to the total amount of (logical) data served (written) to an SSD. In one embodiment, the data-averaged TCO' can be calculated as follows:

$$TCO' = \frac{\sum_{i=1}^{N_D}(C_{I_i} + C'_{M_i} \cdot T_{Lf_i})}{\sum_{j=1}^{N_W} D_j} = \frac{\sum_{i=1}^{N_D}\left[C_{I_i} + C'_{M_i} \cdot \left(T_{W_i} + \frac{W_i - w_i}{\lambda_{L_i} A_i}\right)\right]}{\sum_{j=1}^{N_W} \lambda_j(T_{Lf_{D(j)}} - T_{I_j})}, \quad (3)$$

where $\Sigma_{j=1}^{N_W} D_j$ is the total logical data write amount for all $N_W$ workloads. Herein, logical writes are used as a proxy for physical writes. This is because logical writes are much easier to obtain for most workloads compared to physical writes. When being normalized by the logical writes, the TCO' can reflect the WAF and determine the disk-level wear leveling performance of different allocation algorithms.

Most SSD vendors do not provide APIs or performance counters to measure a physical write quantity. Compared to conventional WAF models that aims at estimating the WAF of an SSD based on a certain criterion, the present write amplification function Ai leverages the data directly measured from an SSD to calculate a WAF for the SSD. The present data-averaged TCO rate model characterizes the effects of write traffic from multiple workloads on the WAF and generalizes the characterization of the write traffic effects as a mathematical model.

Figure 3A:
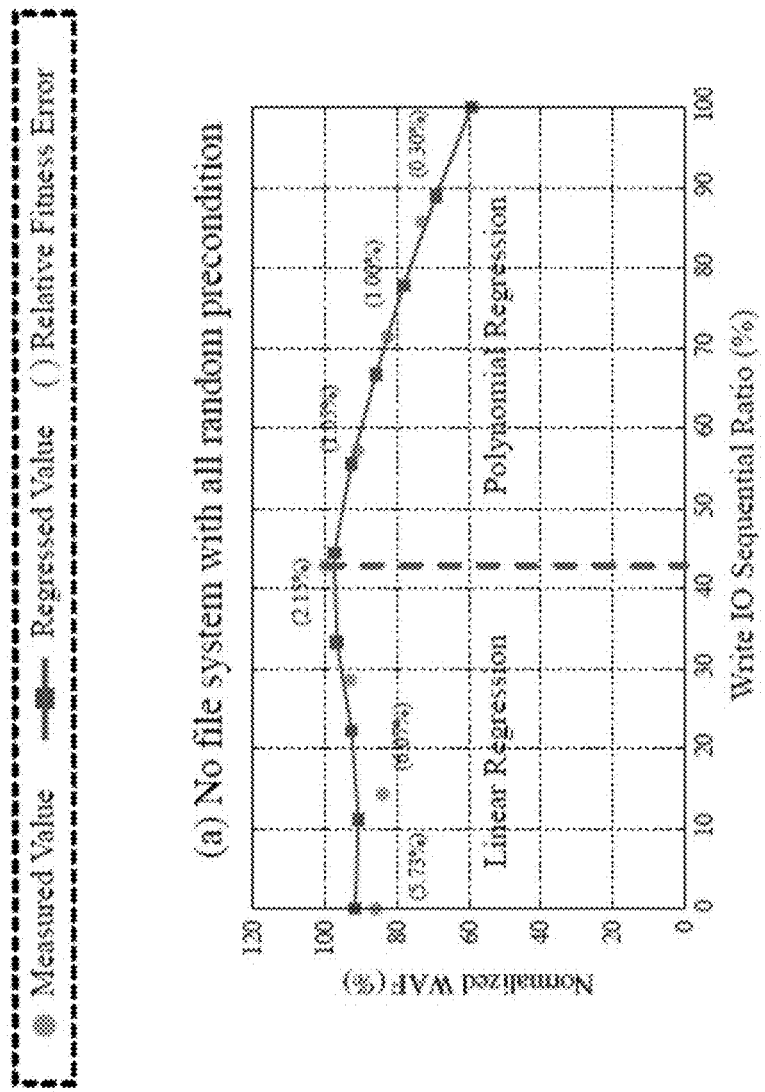
FIG. 3A shows the normalized WAF as a function of sequential ratios for non-filesystem with all random precondition.
Figure 3B:
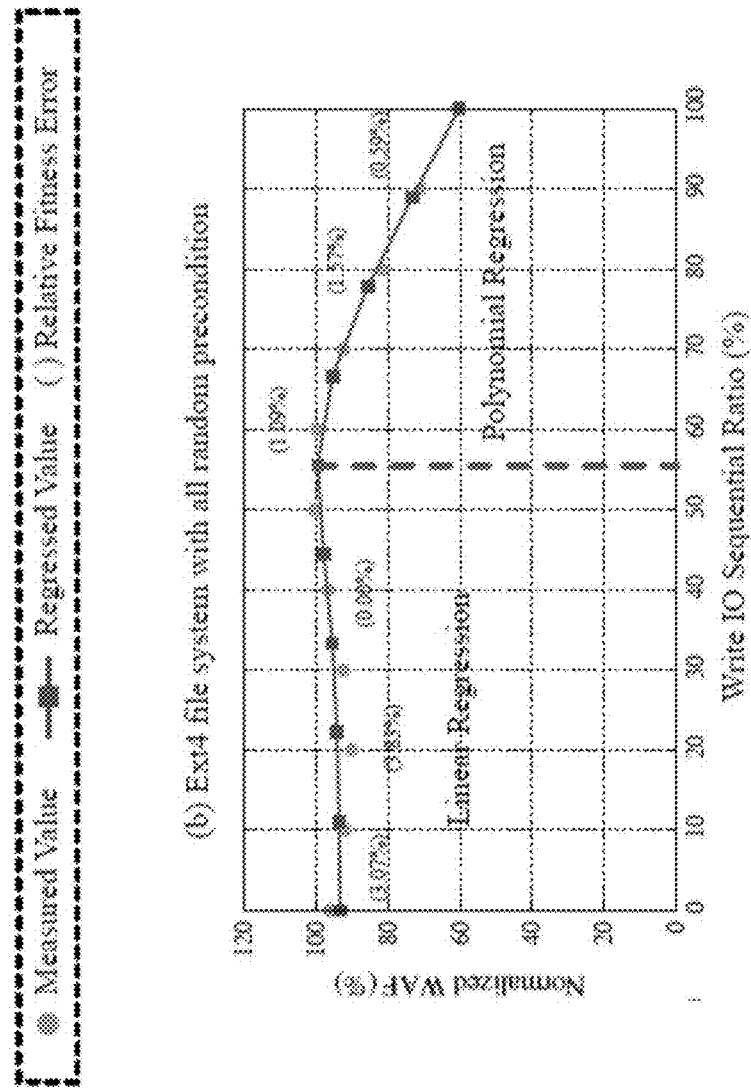
FIG. 3B shows the normalized WAF as a function of sequential ratios for Ext4 filesystem with all random precondition.
Figure 3C:
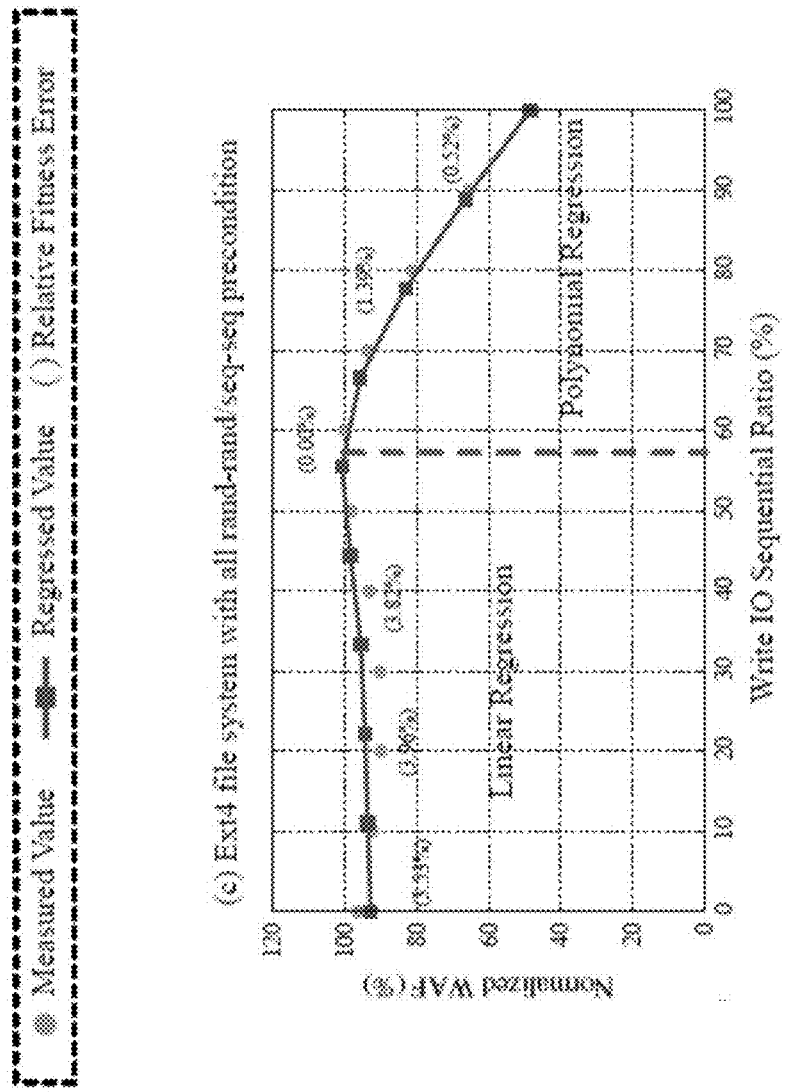
FIG. 3C shows the normalized WAF as a function of sequential ratios for Ext4 filesystem with all random-random and sequential-sequential precondition.

FIGS. 3A, 3B, and 3C show three representative cases from WAF experimental results of preconditioned write I/Os. FIG. 3A shows the normalized WAF as a function of sequential ratios for non-filesystem with all random precondition. FIG. 3B shows the normalized WAF as a function of sequential ratios for Ext4 filesystem with all random precondition. FIG. 3C shows the normalized WAF as a function of sequential ratios for Ext4 filesystem with all random-to-random and sequential-to-sequential precondition.

These representative cases show that the normalized WAF can be constructed as a function of different sequential ratios on write I/Os. The WAF data points are normalized by the largest WAF across different workload sequential ratios (e.g., the WAF under 40.22% sequential ratio in FIG. 3A). As such, the original WAF is in $[1,+\infty)$, while the normalized WAF is in $[0,1]$.

According to these WAF experimental results, it is observed that WAF curves in the three representative cases shown FIGS. 3A, 3B, and 3C are similar. Based on these observations, the normalized WAF curves can be regressed into two stages: a linear regression stage and a decreasing polynomial regression stage. The linear regression stage shows that the normalized WAF of mixed workloads exhibits a linear function indicating that the WAF is almost identical to that of a pure random workload. Beyond a turning point (around 40% to 60%, the WAF dramatically decreases exhibiting a polynomial relationship between the WAF and the sequential ratio. This indicates that a small fraction of random accesses is necessary to intensify the WAF.

According to one embodiment, the normalized WAF (A) is regressed into a piecewise function of sequentiality of I/O operations in the workload as follows.

$$A = f_{seq}(S) = \begin{cases} \alpha S + \beta, & S \in [0, \varepsilon] \\ \eta S^2 + \mu S + \gamma, & S \in (\varepsilon, 1] \end{cases}, \quad (4)$$

where $\alpha$, $\beta$, $\eta$, $\gamma$, $\mu$ and $\varepsilon$ are parameters, and S is the sequential ratio. At the turning point $\varepsilon$, $S=\varepsilon$, therefore $\alpha\varepsilon+\beta=\eta\varepsilon^2\mu\varepsilon+\gamma$. Additionally, $\alpha$ is small since the linear regression stage is relatively smooth.

The regressed mathematical model of the normalized WAF as a function of sequential ratios can be constructed for different memory technology, types and capacity of SSDs that are manufactured by various vendors. Each SSD can have a unique WAF function depending on a number of their hardware-related factors, for example, but not limited to, flash translation layer (FTL), wear leveling, over-provisioning. The regression turning point of the non-filesystem case of FIG. 3A comes earlier than the Ext4 filesystem case of FIGS. 3B and 3C. This is because the bookkeeping overhead of the Ext4 filesystem is heavier than the raw disk. Moreover, when the sequential ratio is 100%, the WAF under the "random-random/sequential-sequential precondition" case shown in FIG. 3C is lower than that under the all-random precondition case shown in FIG. 3B. In the "random-random/sequential-sequential precondition" case, a steady write performance can be reached.

The time-average TCO rate model does not balance incoming workloads across the SSDs in a disk pool, and thus cannot achieve optimal resources utilization. The present system and method provides cost-efficient disk utilization of resources in a disk pool of SSDs while achieving the maximum I/O throughput. In one embodiment, the present system and method employs a performance enhanced management algorithm, herein referred to as minTCO-Perf. The minTCO-Perf algorithm accounts for statistical metrics as a performance factor in workload allocation. In one embodiment, the statistical metrics includes load balancing and resource utilization.

There are two types of resources, namely, throughput (IOPS) and space capacity (GB). The present system and method calculates the utilization U (i, k) of disk i when disk k is selected to serve a new workload $J_N$, as:

$$U(i,k) = \begin{cases} \dfrac{R_U(i)}{R(i)}, & i \neq k \\ \dfrac{R_U(i) + R_{J_N}}{R(i)}, & i = k \end{cases}, \quad (5)$$

where $R_U$ (i), R(i), and $R_{J_N}$ represent the amount of used resources on disk k, the amount of resources of disk i, and the resource requirement of workload $J_N$, respectively. When i is equal to k, the workload $J_N$ is assumed to be assigned to that disk as the new requirement $R_{J_N}$. The Eq. (5) can be used to calculate either throughput utilization $U_p$ (i, k) or space capacity utilization $U_s$ (i, k). The average utilization can be calculated to represent the system utilization of the entire disk pool:

$$\overline{U(k)} = \dfrac{\sum_{i=1}^{N_D} U(i,k)}{N_D}.$$

It is an objective of the system resource utilization to increase either average throughput utilization $U_p$ (i, k) or the average space utilization $U_s$ (i, k).

According to one embodiment, a coefficient of variation (CV) of throughput (or space) utilizations among all disks is used to assess the load balancing. Specifically, when assigning the workload $J_N$ to disk k, the expected CV (k) can be calculated as:

$$CV(k) = \dfrac{\sqrt{\dfrac{\sum_{i=1}^{N_D}[U(i,k) - \overline{U(k)}]^2}{N_D}}}{\overline{U(k)}}. \quad (6)$$

A smaller CV (k) indicates better load balancing in the datacenter.

The minTCO-Perf algorithm aims to minimize the data-average TCO rate while achieving best resource utilization and load balancing among disks. The minTCO-Perf uses an optimization framework to minimize the objective function under constrains listed in Eq. (7).

Minimize:

$$f(R_w) \cdot TCO'(k)$$

$$-g_s(R_r) \cdot \overline{U_s(k)} + h_s(R_r) \cdot CV_s(k)$$

$$-g_p(R_r) \cdot \overline{U_p(k)} + h_p(R_r) \cdot CV_p(k) \quad (7).$$

Subject to:

$$i \in D$$

$$k \in D$$

$$0 \leq TCO'(i,k) \leq Th_c$$

$$0 \leq U_s(i,k) \leq Th_s$$

$$0 \leq U_p(i,k) \leq Th_p$$

Upon the arrival of a new workload $J_N$, the "enhanced cost" of the disk pool is calculated. The object function in Eq. (7) contains the TCO rate cost ($f(R_w)\cdot TCO'(k)$, the resource utilization reward ($g_s(R_r)\cdot \overline{U_s(k)}$) and $g_p(R_r)\cdot \overline{U_p(k)}$), and the load unbalancing penalty ($h_s(R_r)\cdot CV_s(k)$ and $hh_p(R_r)\cdot CV_p(k)$). It is noted that TCO'(k) and TCO'(i, k) represent the TCO rate of the entire disk pool and the TCO rate of disk i, respectively, when the new workload $J_N$ is allocated to the disk k.

The non-negative parameters in Eq. (7) such as $f(R_w)$, $g_s(R_r)$, $g_p(R_r)$, $h_s(R_r)$ and $h_p(R_r)$ are weight functions that are related with the read ratio $$R_r = \frac{readIO\#}{totalIO\#}$$

and write ratio $$\left(R_w = \frac{writeIO\#}{totalIO\#}\right)$$

of workloads. Finally, the disk with the lowest enhanced cost is selected for the new workload $J_N$. In a practical application, write intensive workloads can affect WAF and TCO, and read intensive workloads are sensitive to a load balancing degree. In addition, $Th_c$, $Th_s$, and $Th_p$ are used as the upper bounds for the TCO, the space resources utilization ratio, and the throughput resources utilization ratio, respectively. These bounds can be predefined by the system manager according to the specific environment. For example, one can set the maximum allowed throughput utilization of a disk is 95% of the total TOPS in order to prevent I/O path congestion.

Figure 4:
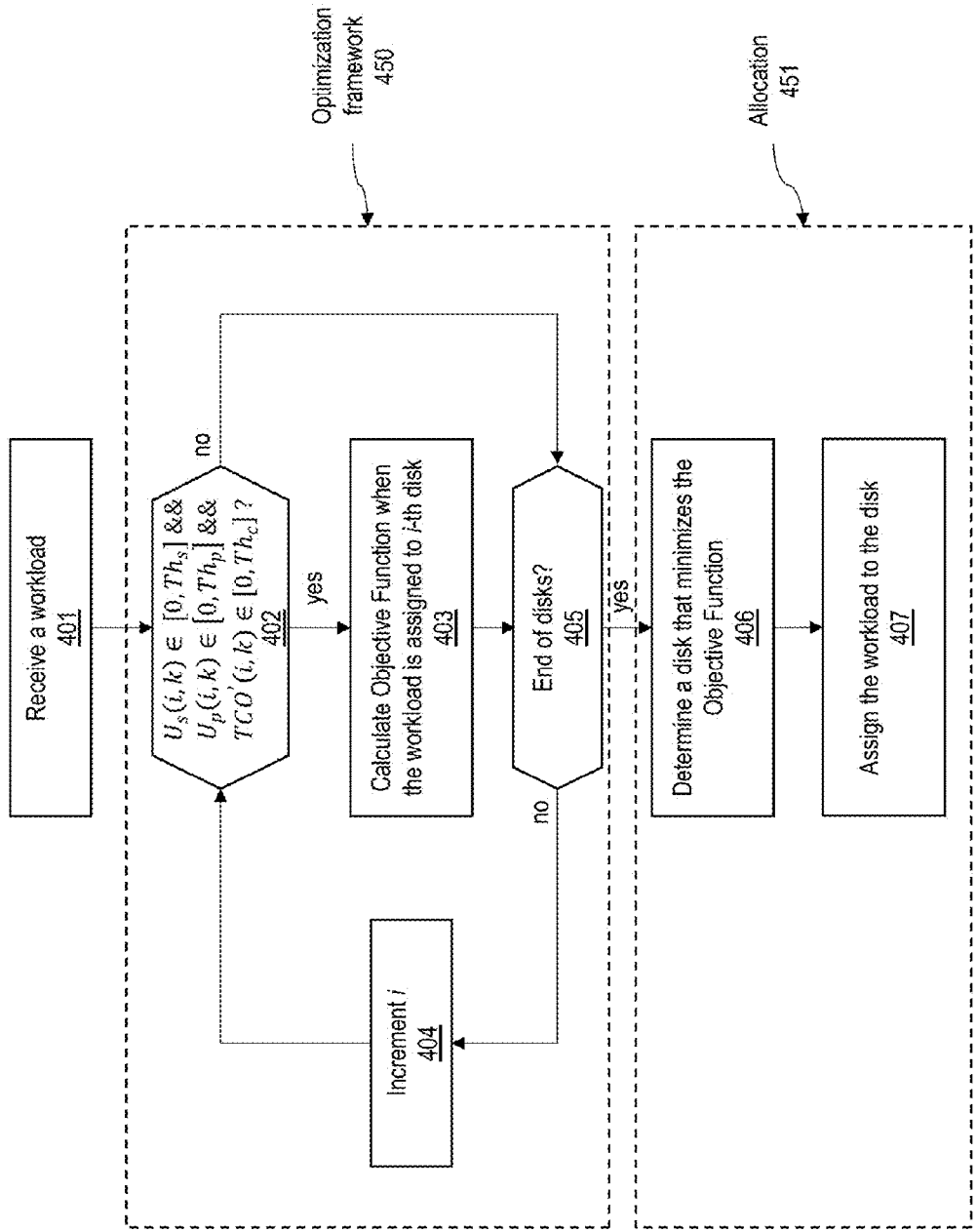
FIG. 4 illustrates a workflow of an example minTCO-Perf algorithm, according to one embodiment.

FIG. 4 illustrates a workflow of an example minTCO-Perf algorithm, according to one embodiment. A dispatcher (e.g., dispatcher 120 of FIG. 1 or dispatcher 520 of FIG. 5) performs a check whether the TCO, the space resources utilization ratio, and the throughput resources utilization ratio fall within their respective upper bounds $Th_c$, $Th_s$, and $Th_p$ (step 402). The dispatcher estimates a cost for a disk i in a disk pool by calculating the objective function of Eq. (7) when the workload would be assigned to the disk i (step 403). The dispatcher repeats this process for each and every disk in the disk pool (steps 402, 403, 405, and 404). After the costs for all the disks in the disk pool are obtained, the dispatcher determines a particular disk that minimizes a TCO (step 406). The dispatcher assigns the workload to the disk (step 407). This process is repeated for a new workload for a new epoch. The estimation of the costs and the determination of a disk that minimizes a TCO can be dynamically performed during runtime. The steps 402-405 form an optimization framework of the minTCO-Perf algorithm of the dispatcher that minimizes the objective function, and the steps 406-407 perform the workload allocation by the dispatcher.

There are numerous commercially available solutions for accelerating the I/O throughput of RAID mode flash disk arrays in a data center. RAID technique transforms a number of independent disks into a larger and a more reliable logical single entity. The present system and method can support storage systems with RAID mode flash disk arrays by extending the minTCO-Perf algorithm.

One of the major problems in a practical implementation of a TCO model in a RAID storage system is the difficulty of calculating (or even monitoring) the exact WAF of RAID disk arrays during runtime. Moreover, for different RAID setups, the process can be more complicated. According to one embodiment, the present system and method employs an approximate approach that works in certain scenarios. The approximation approach aims to guide a data center manager to make allocation decision from a long-term operational point of view.

Figure 5:
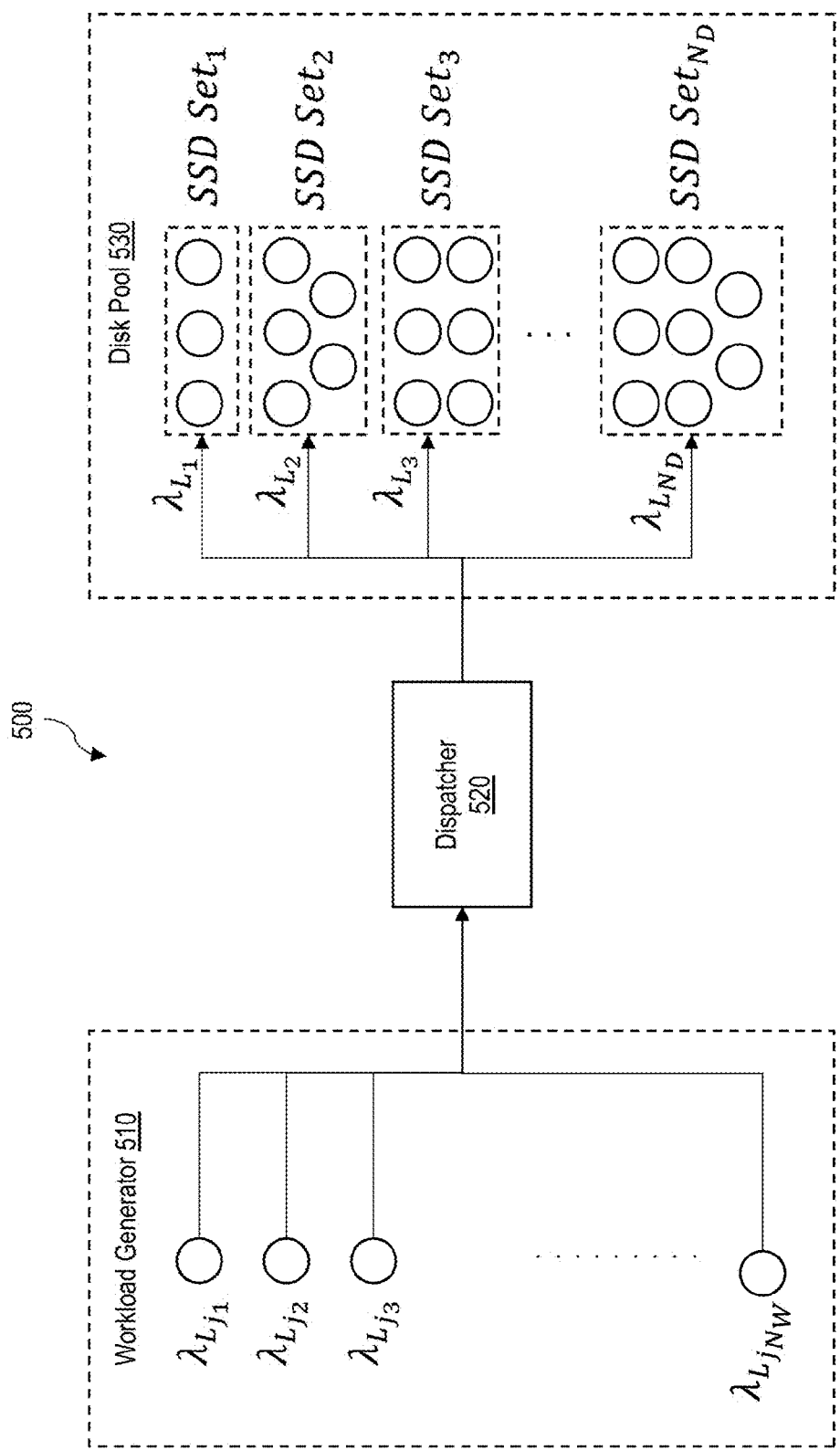
FIG. 5 shows an example architecture of a RAID storage system, according to one embodiment.

FIG. 5 shows an example architecture of a RAID storage system, according to one embodiment. According to one embodiment, an online allocation algorithm minTCO-Perf can be obtained based on the TCO model. The RAID storage system 500 includes a workload generator 510, a dispatcher 520, and a plurality of disk sets $SSD\ Set_1$-$SSD\ Set_{ND}$ contained in the disk pool 530.

The work generator 510 can receive a workload and the dispatcher 520 can estimate a cost for allocating the workload to each and every disk of a disk pool 303 using the present data-average TCO rate model. For example, an estimated cost for a disk set i denotes a cost when the workload would be allocated to the disk set i. The data-average TCO rate model employed by the dispatcher 520 can use logical data writes $\lambda_L$ for each disk contained in the disk pool 530. The logical data writes $\lambda_L$ for the disk set i can be obtained by summing up the estimated logical write rates of all assigned workload streams during an epoch. The physical write rates for the disk set i can be estimated by multiplying the logical write rates in the workload streams with the corresponding WAF. The dispatcher 520 can implement the online allocation algorithm minTCO-Perf and determine a disk set in the disk pool 530 that minimizes the TCO for allocating the workload to the disk pool 530 of the RAID storage system 500. Based on the data-average minimum TCO, the dispatcher 520 can dispatch the workload to the disk set among $SSD\ Set_1$-$SSD\ Set_{ND}$ that minimizes the TCO. This process is repeated for a new workload as shown in FIG. 4

The disk pool has multiple SSDs and disks that are grouped into sets. Each set is the minimum unit that can accept workloads. For simplicity, disks within each set are assumed to be homogeneous, while different sets of disks can be heterogeneous. The main idea of this approximation is to treat each disk set as a single "pseudo-disk", and a set is the destinations of workloads. To apply the present system and method to RAID data center storage system, the TCO and performance metrics for a "pseudo-disk" are converted by multiplying the corresponding adjustment parameters as shown in Table 1. For example, a RAID-1 set with 4 disks has $4C_I$, $4C'_M$, and A=1*fseq( ).

TABLE 1

Conversion table for different RAID modes.

| RAID | Mode | TCO | | | | | Performance | |
|---|---|---|---|---|---|---|---|---|
| | | $C_I$ | $C'_M$ | W | A | $\lambda$ | S | $\rho$ |
| 0 | Strip | N | N | N | 1 | 2 | N/2 | 2 |
| 1 | Mirror | N | N | N | 1 | 1 | N | 1 |
| 5 | Pair | N | N | N | 1 | N/(N − 1) | N − 1 | 4 |

Some of the factors are straightforward and can be ported from the realm of one disk to a "pseudo-disk" (a set of disks) relatively easily. For example, the costs ($C_I$, $C'_M$) and total write cycle limits (W) of a disk set are the sum of those values for each individual disk.

However, the estimation of a WAF function for a disk-set may not simple. For example, RAID-1 mirrors each I/O operation on all disks, so the WAF function of each (homogeneous) disk set remains the same as that of each individual disk. However, WAFs of RAID-0 and RAID-5 are heavily dependent on the actual implementation. For these reasons, the present system and method focuses on a simple implementation that is abstracted for a long-term and large-scale view of a datacenter. In this case, the striping parts of RAID-0 and RAID-5 are also following the same I/O locality and behavior as the non-striping case, and thus a subset of workloads on each disk keeps the same sequential ratio as the non-stripped workload.

For example, a 100% sequential stream with [0~80] pages are stripped into four disks with 10-page striping granularity, and the four disks have [0~10, 41~50], [11~20, 51~60], [21~30, 61~70], and [31~40, 71~80], respectively. The stripped subsets of a sequential stream are physically written continuously on the disk (e.g., [41~50] are physically continuous to [0~10] on disk 1), therefore the sequentiality is kept, and thus WAF functions of the striping disks are identical to that of a single disk. For the parity disk of RAID-5, it is assumed that its I/O behavior also follows the same locality as original workload. Therefore, the WAFs of RAID-0 and RAID-5 can be the same as the WAF of a single disk.

Meanwhile the logical data write rate $\lambda\_L$ and the space capacity S of each set can vary depending on different RAID modes that may be used across these sets. RAID-0 strips the writes and thus it does not trigger any additional logical writes to the set. Therefore, the write rate of RAID-0 is the same, and the C is multiplied by N. RAID-1 mirrors the write, so the logical write rate is doubled. While in RAID-5 mode, for each logical write, N−1 disks are for striping writes, and the remaining one disk is for parity write. Therefore, the overall write rate should be scaled by multiplying N/(N−1). The throughput of a set is the sum of its disks' throughput (NP).

RAID introduces a write penalty ($\rho$). RAID-1 has two IOPS per write operation while one RAID-5 write requires four IOPS per write operation. For a RAID application, an incoming workload's original throughput requirement $P_J$ is converted as follows:

$$P_{Real}(i)=P_J(i) \cdot R_W(i) \cdot \rho(i)+P_J(i) \cdot R_R(i) \quad (8)$$

where $\rho(i)$ is the write penalty for disk I that can be obtained from Table 1. For example, a disk set with RAID-1 mode has 4 disks, each of them has 6000 IOPS, then P(i)=6000*4=24,000 IOPS. For a new incoming workload that requires 30 IOPS with write ratio of 40%, its real requirement on RAID-1 mode can be obtained as: $P_{Real}$30*40%*2+30*(1-40%)=42 IOPS. Besides the changes to the throughput requirement, the performance-enhanced minTCO algorithm of a single disk can be equally applied to RAID modes, and workloads are assigned to disk arrays instead of disks.

According to one embodiment, a method includes: receiving a workload; estimating a cost for allocating the workload to each disk of disks in a disk pool based on a total amount of logical data written to the each disk using a data-average TCO rate model; determining a disk among the disks in the disk pool that minimizes a total cost of ownership (TCO) by comparing costs estimated for the disks; and allocating the workload to the disk.

Media types of the disks in the disk pool may include one or more of a flash memory, a phase-change RAM (PRAM), a spin-transfer torque magnetic random access memory (STT-MRAM), and a resistive RAM (ReRAM).

The data-average TCO rate model may incorporate a plurality of cost factors specific to the disks including a lifetime and a write wearout of the disks, and sequentiality of the workload.

The method may further include: calculating a normalized write amplification factor (WAF) for each disk of the disks in the disk pool. The normalized WAF may be regressed into on a piecewise function with respect to a write sequentiality ratio, and the normalized WAF model includes a linear part and a polynomial part.

The WAF of each disk may be dependent on one or more hardware-related factors including flash translation layer (FTL), wear leveling, and over-provisioning.

The method may further include calculating resource utilization of each disk of the disks in the disk pool.

The resource utilization may include a throughput utilization and a space capacity utilization.

The workload may be dynamically allocated to the disk during runtime.

According to another embodiment, a method includes: receiving a workload; estimating a cost for allocating the workload to each disk set of disk sets in a disk pool of a RAID storage system based on a data-average TCO rate model based on a total amount of logical data written to the each disk set; determining a disk set among the disk sets in the disk pool that minimizes a total cost of ownership (TCO) by comparing costs estimated for the disk sets; and allocating the workload to the disk set.

The RAID storage system may operate in one of RAID 0 mode, RAID 1 mode, and RAID 5 mode.

The method may further include scaling a write rate based on a RAID mode, wherein a throughput of the disk set is a sum of throughputs of the disks contained in the disk set.

The method may further include: calculating a write penalty based on a RAID mode; and converting a throughput requirement of workloads by applying the write penalty.

According to another embodiment, a system includes: a workload generator configured to generate workloads; a plurality of disks stored in a disk pool; and a dispatcher comprising a storage storing a data-average TCO rate model and cost factors for each disk of the plurality of disks in the disk pool and a workload queue for storing the workloads received from a host computer via a host interface. The dispatcher is configured to generate an estimated cost for allocating a workload stored in the workload queue to each disk of the plurality of disks based on a total amount of logical data written to the each disk using a data-average TCO rate model, determine a disk among the plurality of disks in the disk pool that minimizes a TCO by comparing costs estimated for the plurality of disks, and dispatch the workload to the disk.

Media types for the plurality of disks in the disk pool may include one or more of a flash memory, a phase-change RAM (PRAM), a spin-transfer torque magnetic random access memory (STT-MRAM), and a resistive RAM (ReRAM).

The data-average TCO rate model may incorporate a plurality of cost factors specific to the disks including a lifetime and a write wearout of the disks, and sequentiality of the workload.

The dispatcher may be configured to calculate a normalized write amplification factor (WAF) for each disk of the disks in the disk pool, and wherein the normalized WAF is regressed into on a piecewise function with respect to a write sequentiality ratio, and the normalized WAF model includes a linear part and a polynomial part.

The WAF of each disk may be dependent on one or more hardware-related factors including flash translation layer (FTL), wear leveling, and over-provisioning.

The dispatcher may be configured to calculate resource utilization of each disk of the disks in the disk pool.

The resource utilization may include a throughput utilization and a space capacity utilization.

The workload may be dynamically allocated to the disk during runtime.

The dispatcher may be further configured to generate an estimated cost for allocating a workload stored in the workload queue to each disk set of the plurality of disk sets based on the data-average TCO rate model, determine a disk set among the plurality of disk sets in the disk pool that minimizes a TCO by comparing costs estimated for the plurality of disk sets, and dispatch the workload to the disk set.

The RAID storage system may operate in one of RAID 0 mode, RAID 1 mode, and RAID 5 mode.

The dispatcher may be further configured to scale a write rate based on a RAID mode, wherein a throughput of the disk set is a sum of throughputs of the disks contained in the disk set.

The dispatcher may be further configured to: calculate a write penalty based on a RAID mode and convert a throughput requirement of workloads by applying the write penalty.

The above example embodiments have been described hereinabove to illustrate various embodiments of implementing a system and method for allocating workloads to a disk in a disk pool based on a data-average TCO rate model. Various modifications and departures from the disclosed example embodiments will occur to those having ordinary skill in the art. The subject matter that is intended to be within the scope of the invention is set forth in the following claims.

What is claimed is:

1. A method comprising:
   receiving a workload;
   estimating a cost for allocating the workload to each disk of disks in a disk pool based on a total amount of logical data written to the each disk using a data-average total cost of ownership (TCO) rate model, wherein the data-average TCO rate model calculates a normalized write amplification factor (WAF) for each of the disks in the disk pool, and the normalized WAF is regressed into on a piecewise function with respect to a write sequentiality ratio, and the normalized WAF model includes a linear part and a polynomial part;
   determining a disk among the disks in the disk pool that minimizes a TCO by comparing costs estimated for the disks; and
   allocating the workload to the disk.

2. The method of claim 1, wherein media types of the disks in the disk pool includes one or more of a flash memory, a phase-change RAM (PRAM), a spin-transfer torque magnetic random access memory (STT-MRAM), and a resistive RAM (ReRAM).

3. The method of claim 1, wherein the data-average TCO rate model incorporates a plurality of cost factors specific to the disks including a lifetime and a write wearout of the disks, and sequentiality of the workload.

4. The method of claim 1, wherein the WAF of each disk is dependent on one or more hardware-related factors including flash translation layer (FTL), wear leveling, and over-provisioning.

5. The method of claim 1, further comprising calculating resource utilization of each disk of the disks in the disk pool.

6. The method of claim 5, wherein the resource utilization includes a throughput utilization and a space capacity utilization.

7. The method of claim 1, wherein the workload is dynamically allocated to the disk during runtime.

8. A method comprising:
   receiving a workload;
   estimating a cost for allocating the workload to each disk set of disk sets in a disk pool of a RAID storage system based on a data-average total cost of ownership (TCO) rate model based on a total amount of logical data written to the each disk set, wherein the data-average TCO rate model calculates a write rate that is scaled based on a RAID mode, wherein a throughput of the disk set is a sum of throughputs of the disks contained in the disk set;
   determining a disk set among the disk sets in the disk pool that minimizes a TCO by comparing costs estimated for the disk sets; and
   allocating the workload to the disk set.

9. The method of claim 8, wherein the RAID storage system operates in one of RAID 0 mode, RAID 1 mode, and RAID 5 mode.

10. The method of claim 8, further comprising:
    calculating a write penalty based on a RAID mode; and
    converting a throughput requirement of workloads by applying the write penalty.

11. A system comprising:
    a workload generator configured to generate workloads;
    a plurality of disks stored in a disk pool; and
    a dispatcher comprising a storage storing a data-average total cost of ownership (TCO) rate model and cost factors for each disk of the plurality of disks in the disk pool and a workload queue for storing the workloads received from a host computer via a host interface;
    wherein the dispatcher is configured to generate an estimated cost for allocating a workload stored in the workload queue to each disk of the plurality of disks based on a total amount of logical data written to the each disk using a data-average TCO rate model, determine a disk among the plurality of disks in the disk pool that minimizes a TCO by comparing costs estimated for the plurality of disks, and dispatch the workload to the disk, and
    wherein the data-average TCO rate model calculates a normalized write amplification factor (WAF) for each disk of the disks in the disk pool, and wherein the normalized WAF is regressed into on a piecewise function with respect to a write sequentiality ratio, and the normalized WAF model includes a linear part and a polynomial part.

12. The system of claim 11, wherein media types for the plurality of disks in the disk pool includes one or more of a flash memory, a phase-change RAM (PRAM), a spin-transfer torque magnetic random access memory (STT-MRAM), and a resistive RAM (ReRAM).

13. The system of claim 11, wherein the data-average TCO rate model incorporates a plurality of cost factors specific to the disks including a lifetime and a write wearout of the disks, and sequentiality of the workload.

14. The system of claim 11, wherein the WAF of each disk is dependent on one or more hardware-related factors including flash translation layer (FTL), wear leveling, and over-provisioning.

15. The system of claim 11, wherein the dispatcher is configured to calculate resource utilization of each disk of the disks in the disk pool.

16. The system of claim 15, wherein the resource utilization includes a throughput utilization and a space capacity utilization.

17. The system of claim 11, wherein the workload is dynamically allocated to the disk during runtime.

18. The system of claim 11, wherein the dispatcher is further configured to generate an estimated cost for allocating a workload stored in the workload queue to each disk set of the plurality of disk sets based on the data-average TCO rate model, determine a disk set among the plurality of disk sets in the disk pool that minimizes a TCO by comparing costs estimated for the plurality of disk sets, and dispatch the workload to the disk set.

19. The system of claim 18, wherein the dispatcher is further configured to scale a write rate based on a RAID mode, wherein a throughput of the disk set is a sum of throughputs of the disks contained in the disk set.

20. The system of claim 18, wherein the dispatcher is further configured to calculate a write penalty based on a RAID mode and convert a throughput requirement of workloads by applying the write penalty.

21. The system of claim 11, wherein a RAID storage system includes the disk pool, and wherein the RAID storage system operates in one of RAID 0 mode, RAID 1 mode, and RAID 5 mode.

\* \* \* \* \*